United States Patent
Tagawa et al.

(10) Patent No.: US 12,139,130 B2
(45) Date of Patent: Nov. 12, 2024

(54) ONBOARD PROCESSING DEVICE AND CONTROL METHOD FOR ONBOARD PROCESSING DEVICE

(71) Applicant: CLARION CO., LTD., Saitama (JP)

(72) Inventors: Shinya Tagawa, Saitama (JP); Morihiko Sakano, Tokyo (JP); Katsumi Iwano, Saitama (JP)

(73) Assignee: CLARION CO., LTD., Saitama (JP)

( * ) Notice: Subject to any disclaimer, the term of this patent is extended or adjusted under 35 U.S.C. 154(b) by 27 days.

(21) Appl. No.: 16/718,766

(22) Filed: Dec. 18, 2019

(65) Prior Publication Data

US 2020/0198622 A1    Jun. 25, 2020

(30) Foreign Application Priority Data

Dec. 25, 2018  (JP) .................................. 2018-240709

(51) Int. Cl.
*B60W 30/06* (2006.01)
*B60W 30/18* (2012.01)

(52) U.S. Cl.
CPC ...... *B60W 30/06* (2013.01); *B60W 30/18027* (2013.01); *B60W 30/18036* (2013.01)

(58) Field of Classification Search
CPC ........... B60W 30/06; B60W 30/18027; B60W 30/18036
See application file for complete search history.

(56) References Cited

U.S. PATENT DOCUMENTS

| 2014/0058587 | A1 | 2/2014 | Leinfelder |
| 2017/0313306 | A1 | 11/2017 | Nordbruch |
| 2017/0320521 | A1 | 11/2017 | Fujita |
| 2018/0061241 | A1* | 3/2018 | Iwami ..................... G08G 1/168 |
| 2018/0111609 | A1* | 4/2018 | Woo ....................... B60W 30/06 |
| 2018/0120853 | A1* | 5/2018 | Seo ..................... B62D 15/0285 |
| 2018/0345955 | A1* | 12/2018 | Kim ..................... B62D 15/028 |
| 2019/0016384 | A1* | 1/2019 | Carlson ................. B60W 30/00 |

(Continued)

FOREIGN PATENT DOCUMENTS

| CA | 3 041 176 A1 | 4/2018 |
| CN | 105946853 A | 9/2016 |

(Continued)

OTHER PUBLICATIONS

Extended European Search Report issued for the counterpart European Patent Application No. 19218473.7 on May 26, 2020.

(Continued)

*Primary Examiner* — Jelani A Smith
*Assistant Examiner* — Toya Pettiegrew
(74) *Attorney, Agent, or Firm* — IP Business Solutions, LLC (57) ABSTRACT

In an onboard processing device, a parking path when a vehicle, which is a target vehicle, enters a parking place and a parking map including the parking place are obtained by an information obtaining unit, a peripheral environment of the vehicle is detected by a periphery detection unit, a vehicle position on the parking map is estimated by a vehicle position estimation unit, and a drive-out path when the vehicle is driven out from the parking place is set based on the estimated vehicle position, the parking path, and the detected peripheral environment by a path setting unit.

8 Claims, 9 Drawing Sheets

(56) References Cited

U.S. PATENT DOCUMENTS

| | | | |
|---|---|---|---|
| 2019/0094855 A1* | 3/2019 | Choi | G05D 1/0061 |
| 2019/0184981 A1* | 6/2019 | Jung | G05D 1/0088 |
| 2020/0001864 A1* | 1/2020 | Oyama | B60W 10/18 |
| 2020/0017099 A1* | 1/2020 | Yamaguchi | G05D 1/0088 |
| 2020/0031397 A1 | 1/2020 | Hasejima et al. | |
| 2020/0081446 A1* | 3/2020 | Ishinoda | G05D 1/0214 |
| 2020/0369204 A1* | 11/2020 | Suzuki | G08G 1/143 |
| 2020/0398829 A1* | 12/2020 | Kasai | B62D 15/028 |
| 2021/0231769 A1* | 7/2021 | Zaum | G01S 17/931 |
| 2022/0024449 A1* | 1/2022 | Hayakawa | G07C 9/00309 |

FOREIGN PATENT DOCUMENTS

| | | |
|---|---|---|
| CN | 107077791 A | 8/2017 |
| CN | 108121345 A | 6/2018 |
| JP | 2018-004343 A | 1/2018 |
| JP | 2018-069758 A | 5/2018 |
| WO | 2018186253 A1 | 10/2018 |

OTHER PUBLICATIONS

Chinese Office Action issued on Feb. 10, 2023 in corresponding Chinese patent application No. 201911318637.4.

* cited by examiner

ONBOARD PROCESSING DEVICE AND CONTROL METHOD FOR ONBOARD PROCESSING DEVICE

INCORPORATION BY REFERENCE

The present application claims priority under 35 U.S.C. § 119 to Japanese Patent Application No. 2018-240709 filed on Dec. 25, 2018. The content of the applications is incorporated herein by reference in its entirety.

BACKGROUND OF THE INVENTION

Field of the Invention

The present invention relates to an onboard processing device and a control method for the onboard processing device.

Description of the Related Art

Japanese Patent Laid-Open No. 2018-4343 describes an onboard processing device including a storage unit configured to store point group data including a plurality of coordinates of points representing a portion of an object in a first coordinate system, a sensor input unit configured to obtain an output of a sensor configured to obtain information on a periphery of a vehicle, a movement information obtaining unit configured to obtain information on a movement of the vehicle, a local peripheral information creating unit configured to create local peripheral information including a plurality of coordinates of points representing a position of the vehicle and a portion of an object in a second coordinate system based on information obtained by the sensor input unit and the movement information obtaining unit, and a position estimation unit configured to estimate a position of the vehicle in the first coordinate system by estimating a relationship between the first coordinate system and the second coordinate system based on the point group data and the local peripheral information.

Japanese Patent Laid-Open No. 2018-4343 also describes that the vehicle is parked in a predetermined parking position based on the point group data including a parking place, the information from the sensor provided on the vehicle, and the like in an autonomous parking phase.

According to the technique described in Japanese Patent Laid-Open No. 2018-4343, the position of a driving affecting object such as an obstacle is specified by making use of a map made up of the point group data including the parking place, so that the vehicle is parked by way of a parking path that avoids the driving affecting objects. When attempting to drive the vehicle out from the parking place through autonomous driving by applying the technique of Japanese Patent Laid-Open No. 2018-4343, it is considered that a map for drive-out from the parking place is prepared to set a drive-out path based on the map so prepared. However, the method for processing the parking and the drive-out independently is not efficient, and an increase in an amount of data to be handled and an increase in a processing amount may be called for.

Then, an object of the present invention is to provide an onboard processing device for efficiently executing a processing for a drive-out from a parking place such as setting a drive-out path, and a control method for the onboard processing device.

SUMMARY OF THE INVENTION

With a view to achieving the object, there is provided an onboard processing device capable of setting a drive-out path for a target vehicle from a parking place, including an information obtaining unit configured to obtain a parking path when the target vehicle enters the parking place and a parking map configured to specify a position of a driving affecting object that exists on a periphery of the parking place when the target vehicle enters the parking place, a periphery detection unit configured to detect a peripheral environment of the target vehicle, a position estimation unit configured to estimate a vehicle position of the target vehicle on the parking map based on the peripheral environment detected, and a path setting unit configured to set a drive-out path when the target vehicle drives out from the parking place based on the vehicle position estimated, the parking path, and the peripheral environment detected.

In the configuration described above, the path setting unit sets, as the drive-out path, a shift reverse reproduction drive-out path in which the target vehicle is driven in a reverse direction along the parking path or another drive-out path in which the target vehicle is driven along the parking path after the target vehicle drives off from the parking path.

In the configuration described above, the path setting unit determines whether there exists an open space where to enable the target vehicle to perform a direction changing operation in which a direction of the target vehicle is changed to a reverse direction on a periphery of the target vehicle and sets the shift reverse reproduction drive-out path if the path setting unit determines that the open space does not exist.

In the configuration described above, if the path setting unit determines that there exists the open space, the path setting unit determines whether the direction changing operation has been performed based on the parking path, and if the path setting unit determines that the direction changing operation has been performed, the path setting unit sets, as the other drive-out path, a direction reverse reproduction drive-out path in which the target vehicle is driven in a reverse direction along the parking path after the target vehicle is driven towards the parking path without performing a direction changing operation.

In the configuration described above, if the path setting unit determines that there exists the open space and that the direction changing operation has not been performed, the path setting unit sets, as the other drive-out path, a drive-out path with a complement path in which the target vehicle is driven in a reverse direction along the parking path after a direction changing operation in which a direction of the target vehicle is changed in the reverse direction by making use of the open space is performed.

In the configuration described above, the parking map includes, as the driving affecting object, an obstacle for the target vehicle and a grounded object provided in an area including the parking place, and the vehicle position estimation unit estimates the vehicle position on the parking map by performing a processing of matching a position of the driving affecting object that is detected by the periphery detection unit when the target vehicle drives out from the parking place with a position of a driving affecting object in the parking map.

In the configuration described above, the periphery detection unit include an imaging unit configured to image a periphery of the target vehicle, the vehicle position estimation unit includes a first vehicle position estimation unit configured to estimate a vehicle position of the target vehicle through a dead reckoning using a sensor provided on the target vehicle, a second vehicle position estimation unit configured to estimate the vehicle position using a characteristic point extracted from an image imaged by the imaging unit, and an estimation control unit configured to make the first vehicle position estimation unit estimate the vehicle position when a vehicle control unit provided on the target vehicle causes the target vehicle to be driven while following the drive-out path and to make the second vehicle position estimation unit estimate the vehicle position in place of the first vehicle position estimation unit when the characteristic point satisfies a predetermined condition, and causes a driving of the target vehicle when the target vehicle drives out from the parking place to be controlled by making use of the vehicle position so estimated.

In addition, there is provided an onboard processing device for performing a processing for driving out of a target vehicle from a parking place including a first vehicle position estimation unit configured to estimate a vehicle position of the target vehicle through a dead reckoning using a sensor provided on the target vehicle, an information obtaining unit configured to obtain a parking path when the target vehicle enters the parking place, an imaging unit configured to image a periphery of the target vehicle, a second vehicle position estimation unit configured to estimate the vehicle position using a characteristic point extracted from an image imaged by the imaging unit, and an estimation control unit configured to make the first vehicle position estimation unit estimate the vehicle position when the target vehicle drives out from the parking place and to make the second vehicle position estimation unit estimate the vehicle position in place of the first vehicle position estimation unit when the characteristic point satisfies a predetermined condition, and causes a driving of the target vehicle when the target vehicle drives out from the parking place to be controlled by making use of the vehicle position so estimated.

In addition, also, with a view to achieving the object, there is provided a control method for an onboard processing device capable of setting a drive-out path for a target vehicle from a parking place, including: obtaining a parking path when the target vehicle enters the parking place and a parking map configured to specify a position of a driving affecting object that exists on a periphery of the parking place when the target vehicle enters the parking place by an information obtaining unit, detecting a peripheral environment of the target vehicle by a periphery detection unit, estimating a vehicle position of the target vehicle on the parking map based on the detected peripheral environment by a vehicle position estimation unit, setting a drive-out path when the target vehicle drives out from the parking place based on the estimated vehicle position, the parking path, and the detected peripheral environment by a driving control unit, and setting a drive-out path when the target vehicle drives out from the parking place based on the estimated vehicle position, the parking path, and the detected peripheral environment by a path setting unit.

According to an aspect of the present invention, the processing for drive-out such as setting the drive-out path can be performed with good efficiency.

DETAILED DESCRIPTION OF THE PREFERRED EMBODIMENT

Hereinafter, referring to drawings, an embodiment of the present invention will be described.

Figure 1:
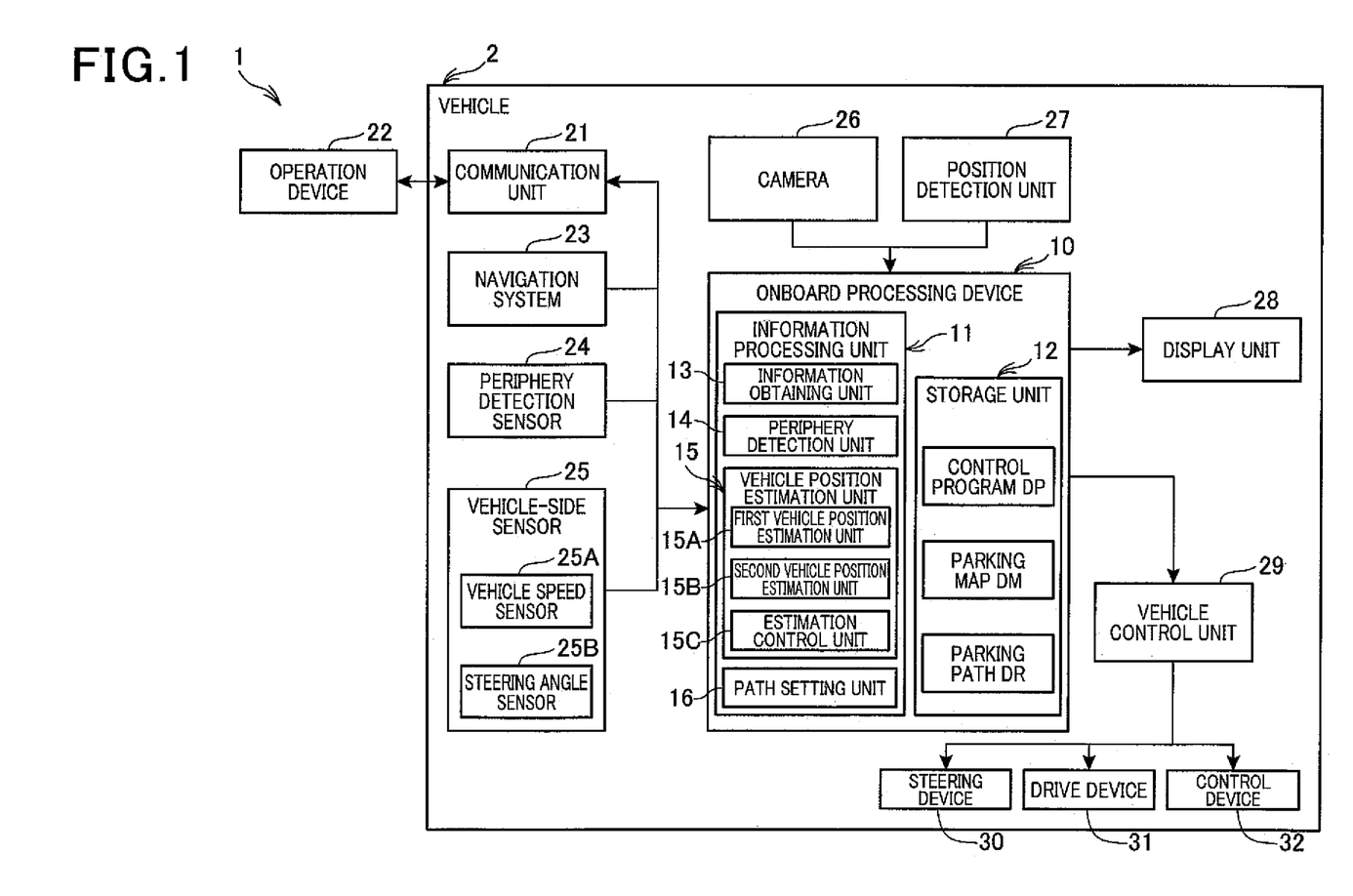
FIG. 1 is a diagram showing a parking system including an onboard processing device according to an embodiment of the present invention.

FIG. 1 is a diagram showing a parking system including an onboard processing device according to an embodiment of the present invention.

This parking system 1 includes an onboard processing device 10 that is mounted on a vehicle 2 (corresponding to a target vehicle), an operation device 22 having a function to communicate with the onboard processing device 10 via a communication unit 21. The operation device 22 is a device through which an instruction from a user of the vehicle 2 (for example, a driver of the vehicle 2) is inputted and which can transmit the instruction so inputted to the onboard processing device 10. For example, mobile electronic equipment having a wireless communication function such as a mobile phone is applied to the operation device 22.

The communication unit 21 functions as a communication unit configured to enable a communication between the operation device 22 and the onboard processing device 10. For example, TCU (Telematics Control Unit) provided on the vehicle 2 is applied to the communication unit 21. FIG. 1 shows pieces of hardware that are involved in the parking system 1 among pieces of hardware that the vehicle 2 includes. More specifically, the vehicle 2 includes a navigation system 23, a periphery detection sensor 24, a vehicle-side sensor 25, a camera 26, a position detection unit 27, a display unit 28, a vehicle control unit 29, a steering device 30, a drive device 31, and a control device 32.

The communication unit 21, the periphery detection sensor 24, the camera 26, the position detection unit 27, the display unit 28, and the vehicle control unit 29 and the others are not limited to those that are provided in advance on the vehicle 2 but may be pieces of hardware provided on the onboard processing device 10. Additionally, the onboard processing device 10 may be configured integrally with the other onboard devices such as the navigation system 23.

The navigation system 23 is an onboard device including a map display function to store map data and display a map including a current position of the vehicle 2 based on the map data and a path guiding function to guide a path from the current position to a destination and is, for example, a known navigation system.

The periphery detection sensor 24 is a sensor configured to detect a position of an obstacle existing on the periphery of the vehicle 2 and is specifically made up of at least one or more of a sonar, a radar, and a lidar (Lidar) that can measure a distance between an obstacle and itself by making use of sound wave, radio wave, electromagnetic wave or light and a stereo camera that can measure a distance between an obstacle and itself by making use of parallax.

The vehicle-side sensor 25 denotes generally sensors provided in advance on the vehicle 2. Sensors involved in the parking system 1 are a vehicle speed sensor 25A configured to detect a vehicle speed of the vehicle 2, and a steering angle sensor 25B configured to detect a steering angle of the vehicle 2. The camera 26 functions as an imaging unit configured to image the periphery of the vehicle 2 and is made up of four cameras configured to image individually a front, left and right, and a rear of the vehicle 2 in this embodiment.

The position detection unit 27 functions as a position detection unit configured to detect a current position of the vehicle 2 and is made up of a GPS unit (GPS receiver) in this embodiment. The display unit 28 is a display device provided on the vehicle 2 and is configured to display various types of information based on output information from the navigation system 23 and the onboard processing device 10.

The vehicle control unit 29 includes for example, CPU, ROM and RAM, and executes a control program stored in ROM or the like to control the driving of the vehicle 2 by controlling the steering device 30, the drive device 31, and the control device 32 based on information from the onboard processing device 10. The steering device 30 is a device configured to steer steered wheels of the vehicle 2. The drive device 31 is a device configured to control the driving force of drive wheels of the vehicle 2. Additionally, the control device 32 is a device configured to control the gear shift and braking force of the vehicle 2. In this embodiment, the vehicle control unit 29 can drive the vehicle 2 based on inputted information from the onboard processing device 10 when the vehicle 2 is parked (is caused to enter a parking place) and is driven out from the parking place.

The onboard processing device 10 includes an information processing unit 11 and a storage unit 12. The information processing unit 11 is made up, for example, of CPU, ROM and RAM. This information processing unit 11 functions as an information obtaining unit 13 configured to obtain information stored in the storage unit 12 such as a parking map DM, a periphery detection unit 14 configured to detect a peripheral environment of the vehicle 2 by making use of the periphery detection sensor 24 and the camera 26, a vehicle position estimation unit 15 configured to estimate a vehicle position on the parking map DM, and a path setting unit 16 configured to set a parking path into and a drive-out path from a parking place, by executing a control program DP stored in the storage unit 12.

The vehicle position estimation unit 15 includes a first vehicle position estimation unit 15A configured to estimate a vehicle position by use of a known dead reckoning technique, a second vehicle position estimation unit 15B configured to estimate a vehicle position on the parking map DM based on a detection result of the periphery detection unit 14, and a estimation control unit 15C configured to select either of the estimation results for use.

The control program DP is stored in advance in the storage unit 12, and the parking map DM created by the periphery detection unit 14 and the parking path DR set by the path setting unit 16 are stored in the storage unit 12.

The parking map DM is map data describing a parking place of the vehicle 2 and a set of points making up a driving affecting object existing in the parking place. A position of the driving affecting object can be identified by referring to the parking map DM.

The driving affecting object is an object that can be identified from images imaged by the periphery detection sensor 24 and the camera 26 and includes specifically a wall interrupting the driving of the vehicle 2 and an obstacle such as another vehicle, as well as a grounded object such as a parking frame line affecting a driving path of the vehicle 2 (hereinafter, referred to as a "white line").

The periphery detection unit 14 detects whether the vehicle 2 is positioned on the periphery of the parking place by making use of a current position detected by the position detection unit 27, the map data of the navigation system 23, and the like. The periphery detection unit 14 may detect that the vehicle 2 is positioned on the periphery of the parking place by an instruction from the driver of the vehicle 2.

When the periphery detection unit 14 detects that the vehicle 2 is positioned on the periphery of the parking place, the periphery detection unit 14 detects a peripheral environment, that is, a position of an obstacle based on a detection result of the periphery detection sensor 24 and detects a white line by making use of an image recognition technique from an image imaged by the camera 26 (or an image imaged by the stereo camera in the periphery detection sensor 24).

A point group indicating the position of the driving affecting object that is detected in the way described above is stored in the storage unit 12 as a parking map DM which is a map of an area including the parking place.

Figure 2:
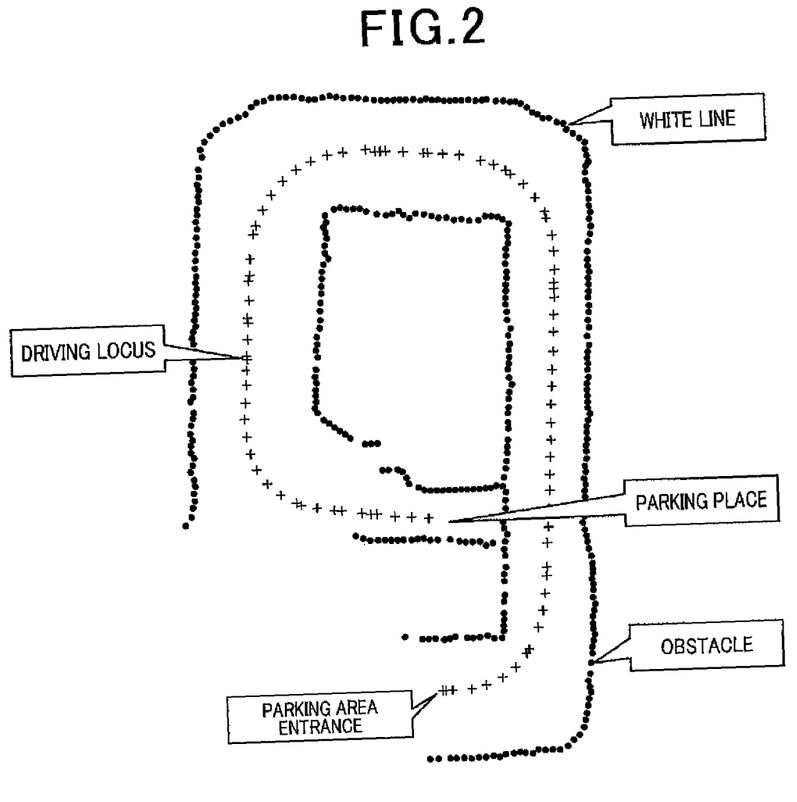
FIG. 2 is a diagram showing an example of a parking map.

FIG. 2 is a diagram showing an example of a parking map DM. FIG. 2 shows point group data describing a point group of a white line constituting a driving affecting object and an obstacle and a point group showing a driving locus (that is, corresponding to a parking path DR) of the vehicle 2 from a parking area entrance to a parking place. That is, FIG. 2 is data showing both the parking map DM and the parking path DR.

The parking map DM is data that can identify a position of a driving affecting object by including at least coordinates of points constituting the driving affecting object on the periphery of the parking place on a two-dimensional plane. Each parking map DM includes positional information that can identify the area of the relevant parking map DM. This positional information is, for example, a position in the vicinity of the entrance, a central position, or a parking position of the area detected by the position detection unit 27. As a result, the parking map DM near the vehicle position can easily be identified from the vehicle position detected by the position detection unit 27.

Known map data can widely be applied to the parking map DM within a range where a blocking target object can be identified. Additionally, the parking path DR data is not limited to the point group data and hence may be vector data, and known data that can identify the parking path can widely be applied to the parking path DR data.

Figure 3:
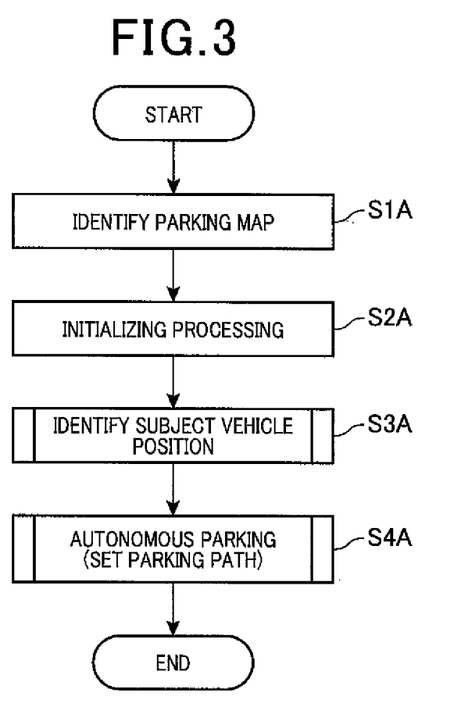
FIG. 3 is a flow chart showing operations of the onboard processing device when an autonomous parking is performed.

FIG. 3 is a flow chart showing operations performed by the onboard processing device 10 for autonomous parking. The autonomous parking is started by an instruction issued by the user of the vehicle 2 via the operation device 22. Due to this, the user can issue an instruction for autonomous parking after he or she gets off the vehicle.

When the autonomous parking is instructed, the information processing unit 11 obtains the vehicle position detected by the position detection unit 27 from the information obtaining unit 13 and identifies a parking map DM positioned within a predetermined distance range from the vehicle position (step S1A).

Next, the information processing unit 11 sets a new two dimensional coordinate system as an initializing processing of the current position of the vehicle 2 (step S2A). This coordinate system is set based on the position and posture of the vehicle 2. For example, the position of the vehicle 2 positioned by the parking place is set to an origin of the coordinate system, and an X axis and a Y axis are set based on an orientation of the vehicle 2. Additionally, the current position of the vehicle 2 is set to an origin (0, 0) of the coordinates.

Next, the information processing unit 11 estimates a self-position by use of the vehicle position estimation unit 15, that is, estimates a vehicle position of the vehicle 2 on the parking map DM (step S3A). In this case, the vehicle position estimation unit 15 estimates a vehicle position on the parking map DM by performing a matching processing by use of the second vehicle position estimation unit 15B in which positions of the obstacle and the white line that are detected by the periphery detection unit 14 are matched with the parking map DM. A know processing such as described in Japanese Patent Laid-Open No. 2018-4343 can be applied to this self-position estimation processing.

Having estimated the vehicle position, the information processing unit 11 sets a parking path DR in such a manner as to avoid the driving affecting object based on the parking map DM by use of the path setting unit 16 and outputs the parking path DR so set to the vehicle control unit 29, whereby the vehicle 2 is driven to follow the parking path DR by use of the vehicle control unit 29 (step S4A). As a result, the vehicle 2 is autonomously parked in the parking place.

Figure 4:
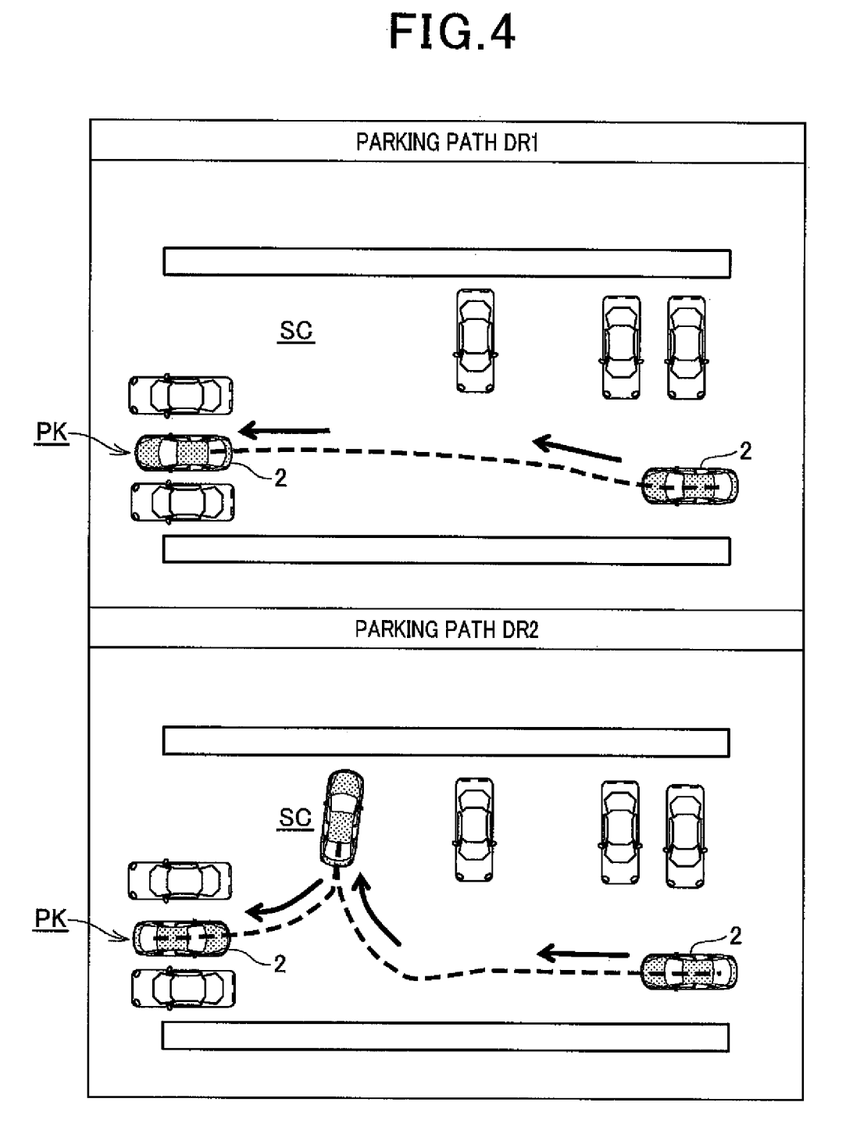
FIG. 4 is a diagram showing two types of parking paths.

There are two patterns exemplified in FIG. 4 for the parking path DR. In FIG. 4, reference character PK denotes a parking place, broken lines denote parking paths DR1, DR2 according to the two patterns, and arrows denote traveling directions of the vehicle 2. Additionally, reference character SC denotes an open space directly in front of the parking place PK.

The parking path DR1, which is a first pattern, is a path in which the vehicle 2 is driven forwards towards the parking place and is then parked as it is while facing forwards. The parking path DR2, which is a second pattern, is a path in which the vehicle 2 is caused to change its direction directly in front of the parking place, so that the vehicle 2 is reversed to be parked in the parking place. This operation of changing the direction of the vehicle is an operation in which the direction of the vehicle 2 is changed in a reverse direction (hereinafter, referred to as a "direction changing operation"). In the parking path DR2, the vehicle 2 is parked backwards by performing the direction changing operation.

In step S4A in FIG. 3, the path setting unit 16 detects whether an open space SC exists for a direction changing operation by making use of the detection result of the periphery detection unit 14 and the parking map DM. Then, when detecting that no open space SC exists, the path setting unit 16 sets the parking path DR1, whereas when detecting that an open space SC exists, the path setting unit 16 sets the parking path DR2. In the case where the open space SC exists, the driver may select either of the parking paths DR1, DR2, or the path setting unit 16 may select either of the parking paths DR1, DR2 based on a predetermined priority.

In addition, the processing in step S4A includes a parking control in which operations of steering, driving, gear shifting and braking (corresponding to steering operation, accelerating operation, gear shifting operation, and braking operation) of the vehicle 2 are performed autonomously. However, the present invention is not limited to the parking control where all the operations are performed autonomously, and hence, the present invention may include a semi-autonomous parking control where one or more of the operations described above are performed manually.

Figure 5:
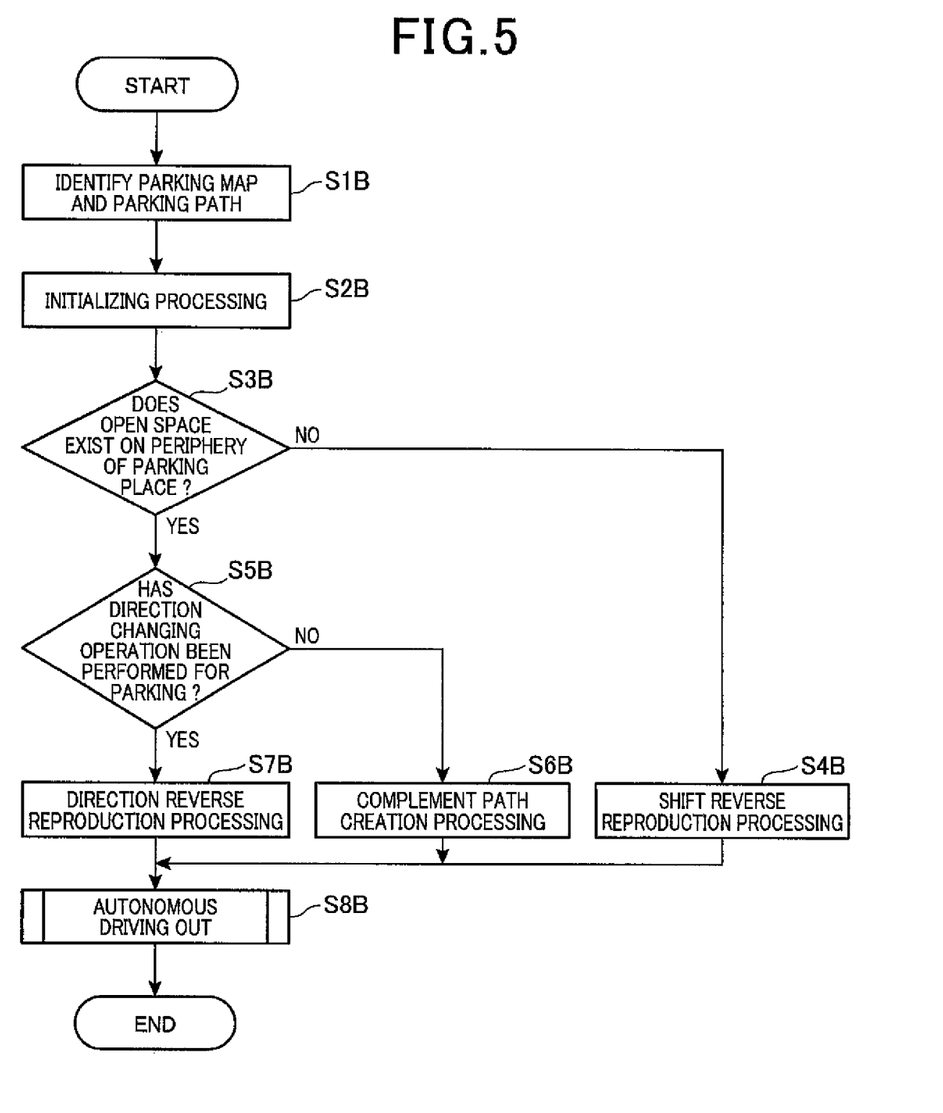
FIG. 5 is a flow chart showing operations of the onboard processing device when an autonomous driving out is performed.

FIG. 5 is a flow chart showing operations of the onboard processing device 10 when autonomous drive-out from the parking place is performed. Similar to the autonomous parking shown in FIG. 3, this autonomous drive-out is started by an instruction issued by the user of the vehicle 2 via the operation device 22. As a result, the user can issue such an autonomous drive-out instruction before he or she gets into the vehicle 2.

When the autonomous drive-out instruction is issued, the information processing unit 11 obtains a vehicle position (corresponding to the parking place PK) that is detected by the position detection unit 27 by use of the information obtaining unit 13 and identifies a parking map DM including the vehicle position and the parking path DR used when the vehicle 2 is parked in the vehicle position (step S1B).

Next, the information processing unit 11 sets a new two-dimensional coordinate system as an initializing processing of the current position of the vehicle 2 (step S2B). This coordinate system is set based on the position and posture of the vehicle 2. Specifically, the current position (corresponding to the parking position PK) of the vehicle 2 is set to and origin of the coordinate system, and an X axis and a Y axis are set based on an orientation of the vehicle 2. Additionally, the current position of the vehicle 2 is set to the origin (0, 0).

Next, the information processing unit 11 determines whether an open space SC exists on the periphery of the parking place PK based on the position of the obstacle detected by the periphery detection sensor 24 by use of the periphery detection unit 14 (step S3B). The periphery detection unit 14 may further determine whether an open space SC exists on the periphery of the parking place PK using the image imaged by the camera 26.

If no open space SC exists (step S3B: NO), the information processing unit 11 performs a shift reverse reproduction processing on the identified parking path DR to thereby set a drive-out path DR1A by use of the path setting unit 16 (step S4B).

Figure 6:
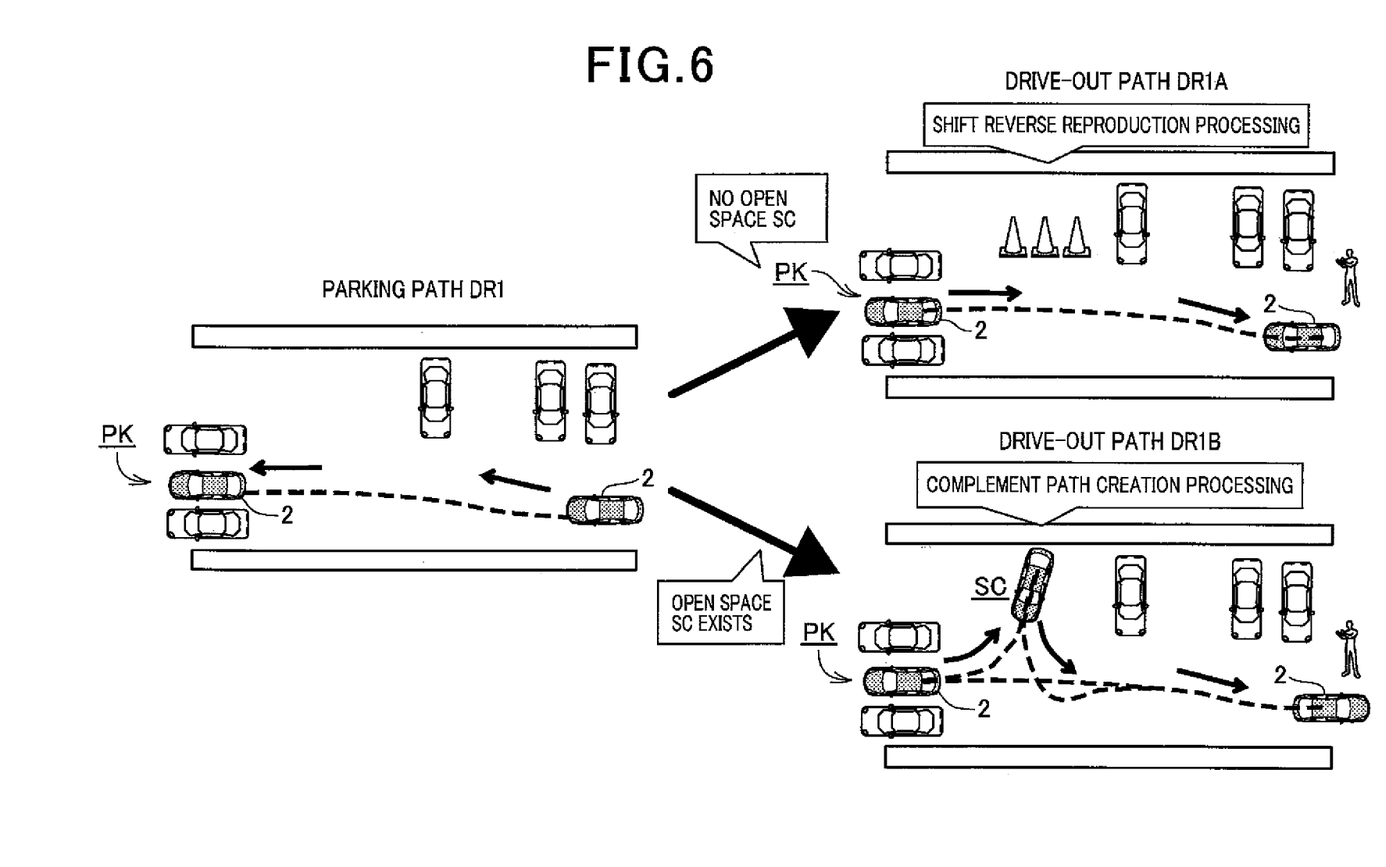
FIG. 6 is a diagram showing a parking path together with a drive-out path when no open space exists.

FIG. 6 is a diagram showing the parking path DR1 where no open space SC exists together with the drive-out path DR1A and the like. As shown in FIG. 6, the shift reverse reproduction processing sets the drive-out path DRA1 (corresponding to a shift reverse reproduction drive-out path) where the vehicle 2 is driven in a reverse direction along the parking path DR1 by setting a path where the vehicle 2 is shifted between forward traveling and reversing for the identified parking path DR1. In this case, the drive-out path DR1A so set may be minutely modified into a more appropriate drive-out path DR1A by making use of the parking map DM and/or the detection result of the periphery detection unit 14 as required.

Returning to FIG. 5, if the open space SC exists (step S3B: YES), the information processing unit 11 determines whether the path setting unit 16 performs the direction changing operation where the direction of the vehicle 2 is changed into the reverse direction when the vehicle 2 is parked while referring to the identified parking path DR (step S5B). If the direction changing operation is not performed (step S5B: NO), the information processing unit 11 causes the path setting unit 16 to perform a complement path creation processing on the identified parking map DM so as to set a drive-out path DRIB (step S6B).

The complement path creation processing sets the drive-out path DRIB (corresponding to the drive-out path with a complement path) where, as shown in FIG. 6, the direction changing operation for changing the direction of the vehicle 2 into the reverse direction by making use of the open space SC is performed and then causes the vehicle 2 to be driven into the reverse direction along the parking path DR (DR1 in FIG. 6). With this drive-out path DR1B, the vehicle 2 is easily directed into the traveling direction after the vehicle 2 is driven out from the parking place.

In the case of the complement path creation processing, too, similar to the shift reverse reproduction processing, the drive-out path DR1B may be modified into a more appropriate drive-out path DR1B by making use of the parking map DM and/or the detection result of the periphery detection unit 14 as required.

Figure 7:
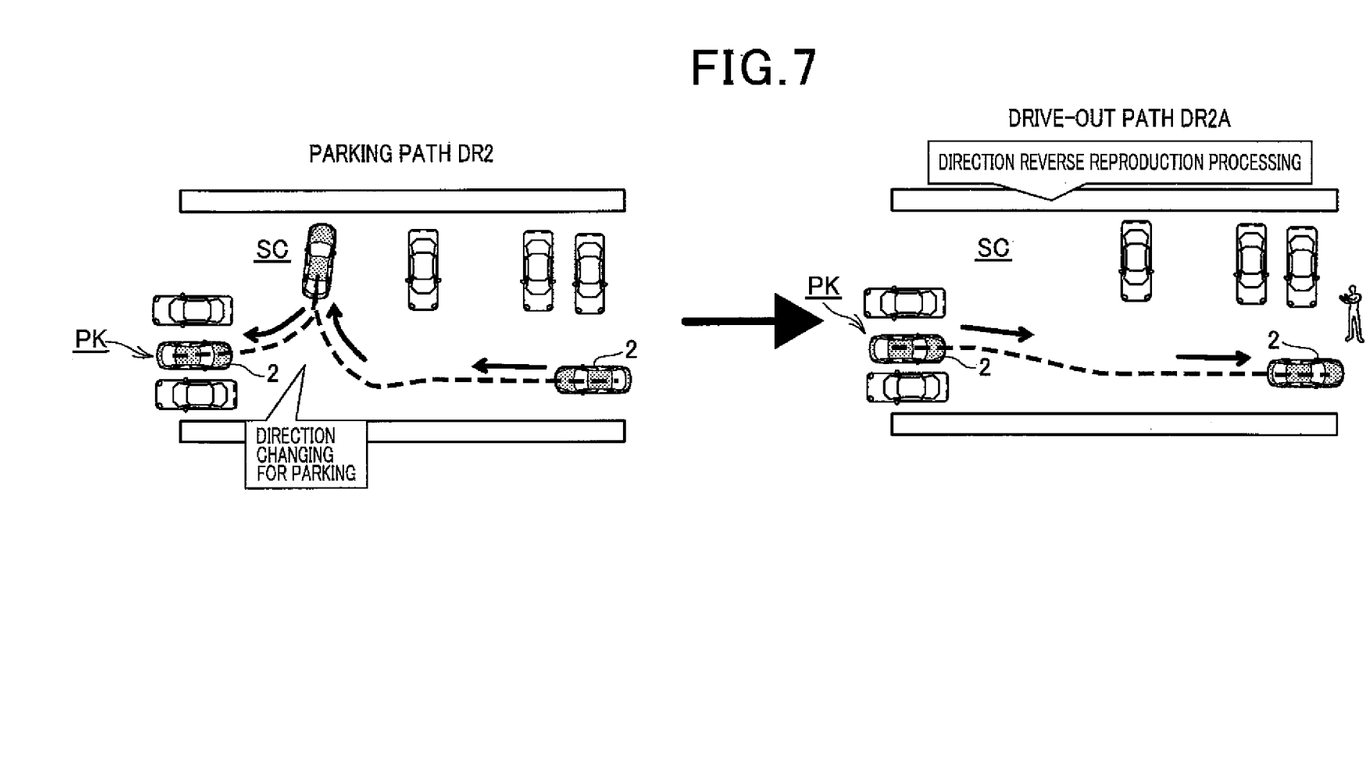
FIG. 7 is a diagram showing a parking path together with a drive-out path when a direction changing operation is performed for parking.

Returning to FIG. 5, if the direction changing operation is performed (step S5B: YES), the information processing unit 11 performs a direction reverse reproduction processing on the identified parking path DR by use of the path setting unit 16 (step S7B). FIG. 7 is a diagram showing a parking path DR2 where the direction changing operation is performed when the vehicle 2 is parked together with a drive-out path DR2A.

As shown in FIG. 7, in the direction reverse reproduction processing, the drive-out path DR2A (corresponding to a direction reverse reproduction drive-out path) is set where the vehicle 2 is caused to be driven in the reverse direction along a parking path DR2 after the vehicle 2 is caused to be driven towards the parking path DR2 without performing the direction changing operation. In this case, as shown in FIG. 7, the drive-out path DR2A can be set where the vehicle 2 is driven out from the parking place only by almost traveling forwards.

In the case of the complement path creation processing, too, similar to the shift reverse reproduction processing, the drive-out path DR2A may be modified minutely into a more appropriate drive-out path DR2A by making use of the parking map DM and/or the detection result of the periphery detection unit 14 as required.

As shown in FIG. 5, when setting any one of the drive-out paths DR1A, DR1B, and DR2A, the information processing unit 11 performs an autonomous driving out processing where the vehicle 2 is caused to be driven to follow the drive-out path so set (step S8B).

Figure 8:
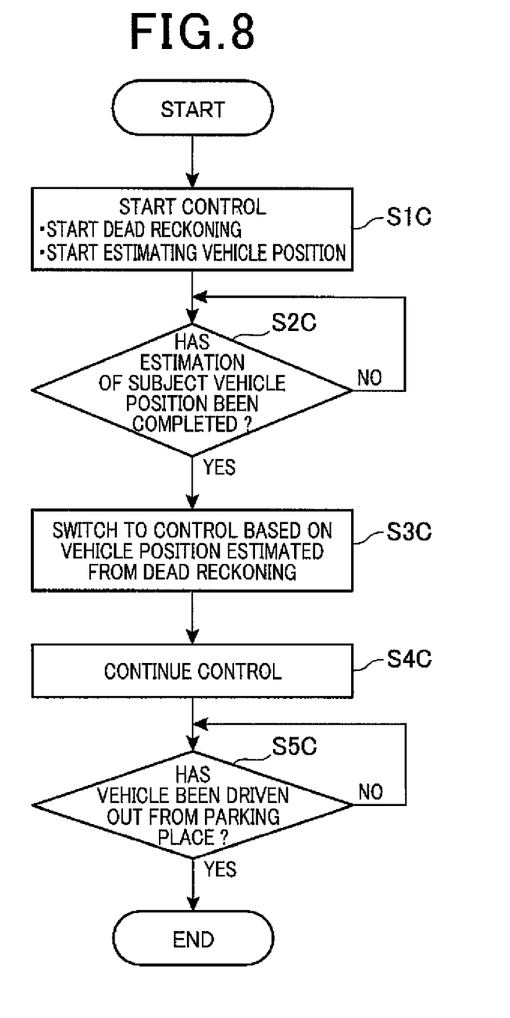
FIG. 8 is a flow chart showing a processing for autonomous driving out.
Figure 9:
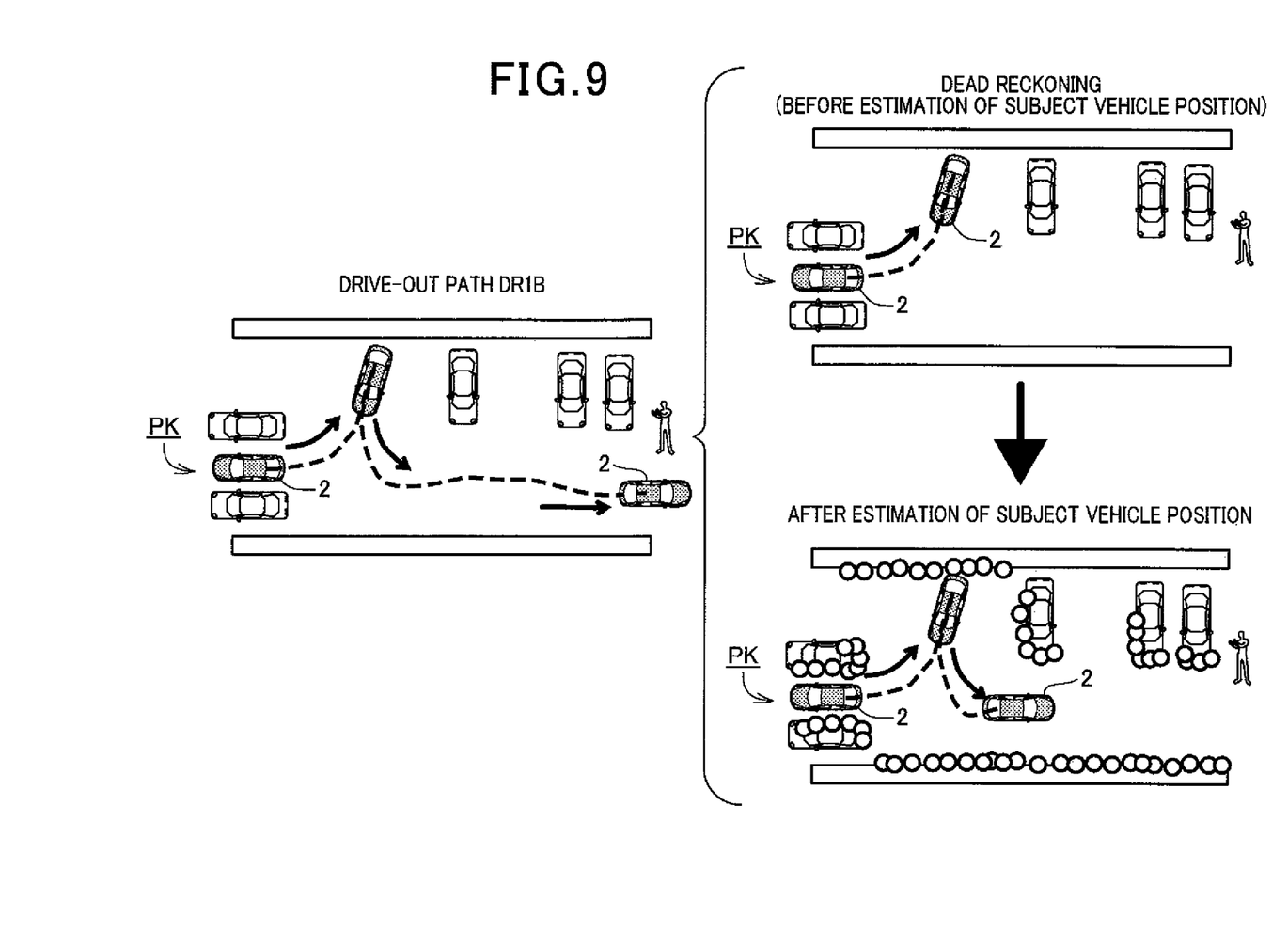
FIG. 9 is a diagram schematically showing a vehicle when the autonomous driving out is performed.

FIG. 8 is a flow chart showing a processing for autonomous driving out. In addition, FIG. 9 shows schematically the vehicle 2 when the autonomous driving out processing is performed. FIG. 9 shows a case where the drive-out path DR1B is used.

As shown in FIGS. 8 and 9, firstly, the information processing unit 11 starts driving the vehicle 2 based on dead reckoning (step S1C). In this case, the information processing unit 11 causes the first vehicle position estimation unit 15A to calculates a vehicle position using a known dead reckoning technique making use of the detection result of the periphery detection unit 14 and causes the vehicle control unit 29 to drive the vehicle 2 along the set drive-out path DR1B based on the result of the calculation. In addition, the information processing unit 11 causes the second vehicle position estimation unit 15B to start a processing of estimating a vehicle position on the parking map DM by performing a known matching processing of matching the positions of the obstacle and the white line that are detected by the periphery detection unit 14 with the parking map DM.

The information processing unit 11 determines whether the vehicle position is estimated by the second vehicle position estimation unit 15B, specifically, extracts a characteristic point (refer to FIG. 9) from an image imaged by the camera 26 and determines whether a rate of coincidence of the extracted characteristic point with a point on the parking map DM exceeds a predetermined threshold (step S2C). A known self-position estimation method only need be applied to the processing in this step S2C.

If the vehicle position is not estimated (step S2C: NO), the information processing unit 11 causes the vehicle 2 to continue to be driven based on dead reckoning. On the other hand, if the vehicle position can be estimated (step S2C: YES), the estimation control unit 15C switches the vehicle position to be used for driving control from the vehicle position based on dead reckoning to the vehicle position estimated by the second vehicle position estimation unit 15B (step S3C).

As shown in FIG. 9, the information processing unit 11 continues the control in which the vehicle 2 is driven along the drive-out path DR1B based on the vehicle position estimated by the second vehicle position estimation unit 15B (step S4C) and determines whether the vehicle 2 has completed the driving out from the parking place (step S5c). If the information processing unit 11 determines that the vehicle 2 has driven out from the parking place, that is, the vehicle 2 has moved along the drive-out path DR1B, the information processing unit 11 ends the autonomous driving out processing.

In this way, when the vehicle 2 is driven out from the parking place, since the vehicle 2 is at first driven to follow a drive-out path DR1B based on the vehicle position calculated using dead reckoning, the vehicle 2 can be started to be driven without any delay. Then, when the predetermined condition indicating that the accuracy with which the vehicle position is estimated based on the characteristic point extracted from the image imaged by the camera 26 is sufficient is satisfied, the vehicle 2 is caused to be driven based on the vehicle position estimated by the second vehicle position estimation unit 15B. As a result, the vehicle 2 can be driven to follow the drive-out path DR1B with good efficiency based on the parking map DM.

Thus, as has been described heretofore, in the onboard processing device 10, the information obtaining unit 13 obtains the parking path DR when the vehicle 2, which is the target vehicle, enters the parking place PK and the parking map DM including the parking place PK, the periphery detection unit 14 detects the peripheral environment of the vehicle 2, and the vehicle position estimation unit 15 estimates the vehicle position on the parking map DM. Then, in the onboard processing device 10, the path setting unit 16 sets a drive-out path when the vehicle 2 drives out from the parking plate PK based on the estimated vehicle position, the parking path DM, and the detected peripheral environment. As a result, even though the map for drive-out is not used, a drive-out path can be set in such a manner as to match the peripheral environment that is detected when the vehicle 2 drives out from the parking place, and a drive-out path is set by making use of the parking path DM, and therefore, a drive-out path can easily be set. Consequently, it becomes easy to reduce the amount of data and the amount of processing that are necessary when the vehicle 2 drives out from the parking place. As a result, the drive-out path can be set with good efficiency.

The path setting unit 16 sets the shift reverse reproduction drive-out path (the drive-out path DR1A shown in FIG. 6) in which the vehicle 2 is driven in the reverse direction along the parking path DR or the other drive-out paths (the drive-out path DR1B shown in FIG. 6, the drive-out path DR2A shown in FIG. 7) in which the vehicle 2 is driven along the parking path DR after the vehicle 2 drives off from the parking path DR. As a result, it becomes easy to set an appropriate drive-out path by making use of the parking path DR. In this case, the path setting unit 16 determines whether the open space SC where the direction changing operation for changing the direction of the vehicle 2 in the reverse direction can be performed exists on the periphery of the vehicle 2, and then, if no open space SC exists, the path setting unit 16 sets the shift reverse reproduction drive-out path (the drive-out path DR1A shown in FIG. 6). Thus, the preferred drive-out path can be set if no open space SC exists.

In addition, if the open space SC exists, the path setting unit 16 determines whether the direction changing operation is performed when the vehicle 2 is parked in the parking place based on the parking path DR, and if the direction changing operation is performed, the path setting unit 16 sets, as the other drive-out paths, the direction reverse reproduction drive-out path (the drive-out path DR2A shown in FIG. 7) in which the vehicle 2 is driven in the reverse direction along the parking path DR after the vehicle 2 is driven towards the parking path DR without performing the direction changing operation. As a result, the preferred drive-out path can be set when the open space SC exists and the direction changing operation is performed when the vehicle 2 is parked in the parking place.

Additionally, if the open space SC exists and the direction changing operation is not performed, the path setting unit 16 sets, as the other drive-out paths, the drive-out path with the complement path (the drive-out path DR1B shown in FIG. 6) in which the vehicle 2 is driven in the reverse direction along the parking path DR after the direction changing operation in which the direction of the vehicle 2 is changed into the reverse direction by making use of the open space SC. As a result, the preferred drive-out path can be set when the open space SC exists and the direction changing operation is not performed when the vehicle 2 is parked in the parking place.

The parking map DM can identify the position of the driving affecting object including the obstacle for the vehicle 2 and the grounded object provided in the area including the parking place PK, and the second vehicle position estimation unit 15B estimates the vehicle position in the parking map DM by performing the matching processing of matching the position of the driving affecting object that is detected by the periphery detection unit 14 when the vehicle 2 drives out from the parking place with the position of the driving affecting object in the parking map DM. As a result, it becomes easy to identify the vehicle position with high accuracy and for the vehicle 2 to be driven in such a manner as to avoid the driving affecting object.

In this embodiment, in the onboard processing device 10 for performing the processing for the drive-out of the vehicle 2 from the parking place PK, the onboard processing device 10 includes the first vehicle position estimation unit 15A configured to estimate the vehicle position of the vehicle 2 through dead reckoning using the sensor provided on the vehicle 2, the information obtaining unit 13 configured to obtain the parking path DR when the vehicle 2 enters the parking place PK, the camera 26 functioning as the imaging unit configured to image the periphery of the vehicle 2, the second vehicle position estimation unit 15B configured to estimate the vehicle position using the characteristic point extracted from the image imaged by the camera 26, and the estimation control unit 15C configured to cause the first vehicle position estimation unit 15A to estimate the vehicle position when the vehicle 2 is driven out from the parking place PK and cause the second vehicle position estimation unit 15B to estimate the vehicle position in place of the first vehicle position estimation unit 15A when the characteristic point satisfies the predetermined condition, and the driving of the vehicle 2 when the vehicle 2 drives out from the parking place is controlled by making use of the estimated vehicle position.

According to this configuration, the vehicle 2 can be driven out from the parking place PK without any delay, and it becomes easy to estimate the vehicle position on the parking map DM, whereby the autonomous driving out of the vehicle 2 from the parking place can be carried out efficiently and easily.

In the event that the first vehicle position estimation unit 15A is not provided, only with the second vehicle position estimation unit 15B, the vehicle position cannot be estimated accurately unless the characteristic point is obtained after the vehicle 2 is driven over a certain distance. In addition, in the event that the second vehicle position estimation unit 15B is not provided, only with the first vehicle position estimation unit 15A, since only a relative positional relationship is known, an error is accumulated more as the driving distance becomes longer, whereby the positional accuracy is deteriorated. In addition, in the event that a GPS method using the position detection unit 27 is used, the updating frequency is slow, resulting in a disadvantage in which no reception can be attained under a roof, and hence, the GPS method cannot be made use of.

The embodiment that has been described heretofore only exemplifies one embodiment of the present invention, and hence, the embodiment described can arbitrarily be modified or adapted without departing from the spirit and scope of the present invention.

For example, the individual constituent elements of the parking system 1 shown in FIG. 1 can arbitrarily be realized by cooperation of the hardware and the software. Additionally, as to the individual flow charts, processings corresponding to the individual steps may be divided or combined.

In the embodiment described above, while the present invention is described as being applied to the onboard processing device 10 shown in FIG. 1 and the control method for the onboard processing device 10, the present invention is not limited to the embodiment described above.

REFERENCE SIGNS LIST 1 parking system
2 vehicle (target vehicle)
10 onboard processing device
11 information processing unit
12 storage unit
13 information obtaining unit
14 periphery detection unit
15 vehicle position estimation unit
15A first vehicle position estimation unit
15B second vehicle position estimation unit
15C estimation control unit
16 path setting unit
21 communication unit
22 operation device
23 navigation system
24 periphery detection sensor
25 vehicle-side sensor
27 position detection unit
28 display unit
29 vehicle control unit
DM parking map
DR, DR1, DR2 parking path
DR1A, DR1B, DR2A drive-out path
PK parking place SC open space

What is claimed is:

1. An onboard processing device capable of setting a drive-out path for a target vehicle from a parking place, comprising:
a first processor;
sensors and cameras provided on at least one of a front, left and right, and a rear of the target vehicle; and
a memory storing a parking map and recording a parking path of the target vehicle in the parking map,
wherein the first processor includes
an information obtaining unit configured to obtain a current position of the target vehicle detected by a position detection unit and obtain the parking path when the target vehicle enters the parking place located at the end of the parking path and a parking map configured to specify a position of a driving affecting object that exists on a periphery of the parking place when the target vehicle enters the parking place;
a periphery detection unit configured to detect a peripheral environment of the target vehicle by using at least one of the sensors and cameras;
a vehicle position estimation unit configured to estimate a vehicle position of the target vehicle on the parking map based on the peripheral environment detected; and
a path setting unit configured to set the drive-out path when the target vehicle drives out from the parking place based on the vehicle position estimated, the parking path, and the peripheral environment detected,
wherein the parking map is map data describing the parking place of the target vehicle and a driving affecting object existing in the parking place, and comprises, as the driving affecting object, an obstacle for the target vehicle and a grounded object provided in an area including the parking place,
at least one of the sensors and cameras detecting the obstacle and the grounded object,
the periphery detection unit detects positions of the obstacle and the grounded object based on a detection result of the at least one of sensors and cameras, and stores the positions of the detected obstacle and the grounded object in the memory as the parking map,
the first processor stores the parking path in the memory when a parking instruction is issued by a user of the target vehicle,
wherein when autonomous driving out is instructed from the user of the target vehicle, the first processor obtains the current position that is detected by the position detection unit and identifies; from the memory, the parking map including the current position; and the latest parking path used when the target vehicle is parked in the current position, the first processor sets a new two-dimensional coordinate system, the current position of the target vehicle is set to origin of the coordinate system, and an X axis and a Y axis of the coordinate system are set based on an orientation of the vehicle,
wherein by making use of the detection result of the periphery detection unit and the parking map, the path setting unit determines whether there exists an open space, on the periphery of the parking place, where to enable the target vehicle to perform a direction changing operation in which the target vehicle stops at and faces into the parking place and reverses into the open space and pulls forward into the drive-out path, or the target vehicle stops at and faces into the open space and reverses into the parking place and pulls forward into the drive-out path, so that a direction of the front of the target vehicle is changed and directed into a traveling direction of the drive-out path,
wherein by making use of the detection result of the periphery detection unit and the parking path recorded in the parking map, when the path setting unit determines that there exists the open space, with reference to the identified parking path recorded in the memory, the path setting unit determines whether the direction changing operation to turn around the target vehicle has already been performed by using the open space and the target vehicle has been parked backwards into the parking place in the identified parking path to the current position, and
when the path setting unit determines that the direction changing operation to turn around the target vehicle has already been performed by using the open space and that the target vehicle has been parked backwards into the parking place, the path setting unit automatically sets a direction reverse reproduction drive-out path in which the target vehicle is driven forward from the parking place when traveling the target vehicle along the drive-out path, and the first processor performs an autonomous driving out processing where the target vehicle is automatically driven to follow the drive-out path, and
wherein by making use of the detection result of the periphery detection unit and the parking path recorded in the parking map, when the path setting unit determines that there exists the open space and that the direction changing operation to turn around the target vehicle has not been performed at the open space and the target vehicle has been parked forward into the parking place, the path setting unit automatically sets the drive-out path with a complement path in which the target vehicle reverses into the open space and pulls forward into the drive-out path and the direction changing operation to turn around the target vehicle is performed by using the open space in order to travel the target vehicle forward when traveling the target vehicle along the drive-out path, and the first processor performs the autonomous driving out processing where the target vehicle is automatically driven to follow the drive-out path.

2. The onboard processing device according to claim 1, wherein the vehicle position estimation unit estimates the vehicle position on the parking map by performing a processing of matching a position of the driving affecting object that is detected by the periphery detection unit when the target vehicle drives out from the parking place with a position of the driving affecting object in the parking map.

3. The onboard processing device according to claim 1, wherein the first processor comprises, as the vehicle position estimation unit:
a first vehicle position estimation unit configured to estimate a vehicle position of the target vehicle through a dead reckoning using the at least one of sensors provided on the target vehicle;
a second vehicle position estimation unit configured to estimate the vehicle position using a characteristic point extracted from an image imaged by the at least one of cameras; and
an estimation control unit configured to make the first vehicle position estimation unit estimate the vehicle position when a second processor equipped with a vehicle control unit provided on the target vehicle causes the target vehicle to be driven while following the drive-out path and to make the second vehicle position estimation unit estimate the vehicle position in place of the first vehicle position estimation unit when the characteristic point satisfies a predetermined condition, and causes driving of the target vehicle when the target vehicle drives out from the parking place to be controlled by making use of the vehicle position so estimated.

4. A control method for an onboard processing device that is capable of setting a drive-out path for a target vehicle from a parking place and that is provided with sensors and cameras provided on at least one of a front, left and right, and a rear of the target vehicle, and with a processor including a memory storing a parking map and recording a parking path of the target vehicle in the parking map, an information obtaining unit, a position detection unit, a periphery detection unit, a vehicle position estimation unit, and a path setting unit, the control method comprising:

obtaining a current position of the target vehicle and obtaining the parking path when the target vehicle enters the parking place located at the end of the parking path and a parking map configured to specify a position of a driving affecting object that exists on a periphery of the parking place when the target vehicle enters the parking place by the information obtaining unit;

detecting a peripheral environment of the target vehicle by the periphery detection unit including the sensors and cameras;

estimating a vehicle position of the target vehicle on the parking map based on the detected peripheral environment by the vehicle position estimation unit; and setting the drive-out path when the target vehicle drives out from the first open space based on the estimated vehicle position, the parking path, and the detected peripheral environment by the path setting unit, the control method further comprising:

wherein the parking map is map data describing the parking place of the target vehicle and the driving affecting object existing in the parking place, and comprises, as the driving affecting object, an obstacle for the target vehicle and a grounded object provided in an area including the parking place, at least one of the sensors and cameras detecting the obstacle and the grounded object, the periphery detection unit detects positions of the obstacle and the grounded object based on a detection result of the at least one of sensors and cameras, and stores the positions of the detected obstacle and the grounded object in the memory as the parking map, the processor stores the parking path in the memory when a parking instruction is issued by a user of the target vehicle, when autonomous driving out is instructed from the user of the target vehicle, obtaining the current position that is detected by the position detection unit and identifying: from the memory, the parking map including the current position; and the latest parking path used when the target vehicle is parked in the current position, setting a new two-dimensional coordinate system, the current position of the target vehicle is set to origin of the coordinate system, and an X axis and a Y axis of the coordinate system are set based on an orientation of the vehicle;

by making use of the detection result of the periphery detection unit and the parking map, determining whether there exists an open space, on the periphery of the parking place, where to enable the target vehicle to perform a direction changing operation in which the target vehicle stops at and faces into the parking place and reverses into the open space and pulls forward into the drive-out path, or the target vehicle stops at and faces into the open space and reverses into the parking place and pulls forward into the drive-out path, so that a direction of the front of the target vehicle is changed and directed into a traveling direction of the drive-out path by the path setting unit;

by making use of the detection result of the periphery detection unit and the parking path recorded in the parking map, when the path setting unit determines that there exists the open space, with reference to the identified parking path recorded in the memory, determining whether the direction changing operation to turn around the target vehicle has already been performed by using the open space and the target vehicle has been parked backwards into the parking place in the identified parking path to the current position by the path setting unit, and when the path setting unit determines that the direction changing operation to turn around the target vehicle has already been performed by using the open space and that the target vehicle has been parked backwards into the parking place, automatically setting a direction reverse reproduction drive-out path in which the target vehicle is driven forward from the parking place when traveling the target vehicle along the drive-out path, and performing an autonomous driving out processing where the target vehicle is automatically driven to follow the drive-out path, and by making use of the detection result of the periphery detection unit and the parking path recorded in the parking map, when the path setting unit determines that there exists the open space and that the direction changing operation to turn around the target vehicle has not been performed at the open space and the target vehicle has been parked forward into the parking place, automatically setting the drive-out path with a complement path in which the target vehicle reverses into the open space and pulls forward into the drive-out path and the direction changing operation to turn around the target vehicle is performed by using the open space in order to travel the target vehicle forward when traveling the target vehicle along the drive-out path, and performing the autonomous driving out processing where the target vehicle is automatically driven to follow the drive-out path.

5. The onboard processing device according to claim 1, wherein the open space is directly in the right or left front of the parking place in the traveling direction of the drive-out path.

6. The onboard processing device according to claim 1, wherein the path setting unit sets the drive-out path in which the target vehicle is driven along the parking path after the target vehicle drives off from the parking path.

7. The control method according to claim 4, wherein the open space is directly in the right or left front of the parking place in the traveling direction of the drive-out path.

8. The control method according to claim 4, wherein the path setting unit sets the drive-out path in which the target vehicle is driven along the parking path after the target vehicle drives off from the parking path.

* * * * *